United States Patent
Roman

Patent Number: 5,863,052
Date of Patent: Jan. 26, 1999

[54] COLLAPSIBLE CARPENTRY WORK STATION AND PUSH CART COMBINATION

[76] Inventor: Gregory S. Roman, 924 N. Adams, Wauconda, Ill. 60084

[21] Appl. No.: 329,981

[22] Filed: Oct. 27, 1994

[51] Int. Cl.⁶ ................................................. B25H 1/00
[52] U.S. Cl. .................. 280/30; 280/652; 280/47.19; 74/16; 144/286.1
[58] Field of Search .................... 280/30, 35, 639, 280/640, 40, 652, 43, 43.24, 47.18, 47.19, 47.34, 47.35, 645; 312/30; 269/289 R, 16, 17; 74/16; 248/637, 646, 653; 144/285, 286 R

[56] References Cited

U.S. PATENT DOCUMENTS

| | | | |
|---|---|---|---|
| 452,714 | 5/1891 | Martin | 280/43 |
| 575,330 | 1/1897 | Cook . | |
| 1,005,063 | 10/1911 | Nordstrom et al. . | |
| 1,363,020 | 12/1920 | Shewalter | 269/17 |
| 1,812,890 | 7/1931 | McWhorter . | |
| 1,828,248 | 10/1931 | Hallowell et al. . | |
| 2,528,872 | 11/1950 | Dick | 280/43 |
| 2,528,935 | 11/1950 | Williams | 312/30 |
| 3,118,685 | 1/1964 | Jordan . | |
| 3,223,429 | 12/1965 | Hastings | 280/47.35 |
| 3,637,232 | 1/1972 | Bourgraf et al. | 280/640 |
| 3,741,586 | 6/1973 | Wiczer | 280/652 |
| 3,857,460 | 12/1974 | Nini . | |
| 3,874,531 | 4/1975 | Mayo . | |
| 3,941,002 | 3/1976 | Tucker, Jr. | 74/16 |
| 4,192,541 | 3/1980 | Ferneau | 280/640 |
| 4,398,736 | 8/1983 | De Wijn . | |
| 4,429,897 | 2/1984 | Friedman et al. . | |
| 4,460,188 | 7/1984 | Maloof . | |
| 4,460,189 | 7/1984 | Goff . | |
| 4,465,114 | 8/1984 | Schumacher | 144/286 R |
| 4,565,382 | 1/1986 | Sherman . | |
| 4,599,968 | 7/1986 | Ryder et al. . | |
| 4,620,712 | 11/1986 | Blackwell . | |
| 4,624,467 | 11/1986 | Burns . | |
| 4,705,280 | 11/1987 | Burns . | |
| 4,822,065 | 4/1989 | Enders . | |
| 4,846,485 | 7/1989 | Payne . | |
| 4,978,132 | 12/1990 | Wilson et al. . | |
| 5,028,060 | 7/1991 | Martin . | |
| 5,067,535 | 11/1991 | Wolff | 144/286 R |
| 5,080,387 | 1/1992 | Ryals . | |
| 5,161,590 | 11/1992 | Otto | 144/285 |
| 5,174,349 | 12/1992 | Svetlik et al. | 269/16 |
| 5,183,372 | 2/1993 | Dinverno . | |
| 5,201,536 | 4/1993 | Bono et al. . | |
| 5,224,531 | 7/1993 | Blohm . | |
| 5,240,264 | 8/1993 | Williams . | |
| 5,257,892 | 11/1993 | Branch . | |
| 5,284,331 | 2/1994 | Lee et al. | 269/16 |
| 5,329,979 | 7/1994 | Miller et al. | 144/285 |
| 5,431,206 | 7/1995 | McAllister | 144/285 |
| 5,437,319 | 8/1995 | Garuglieri | 248/637 |

*Primary Examiner*—Brian L. Johnson
*Assistant Examiner*—Min Yu
*Attorney, Agent, or Firm*—Meroni & Meroni

[57] ABSTRACT

A portable collapsible work station for quick set up and storage is provided. The work station comprises an elongated frame structure including a pair of side frames. A collapsible wheel carrying frame is pivotally mounted at a first intermediate position of the elongated frame structure. The collapsible wheel carrying frame being pivoted on the elongated frame structure from a storage position lying within a horizontal plane through the elongated frame structure to an extended operating position for supporting the elongated frame structure. A support leg structure is pivotally mounted at a second intermediate position of elongated frame structure enabling the support leg structure to be moved from a storage position coplanar with the collapsible wheel carrying frame to the extended operating position for supporting the elongated frame structure. A power tool is rotatably secured to the elongated frame structure for rotation from a tool storage position located internally of the elongated frame structure to a tool operating position on top of the elongated frame structure.

22 Claims, 12 Drawing Sheets

COLLAPSIBLE CARPENTRY WORK STATION AND PUSH CART COMBINATION

BACKGROUND OF THE INVENTION

1. Field of the Invention

The present invention relates generally to a work station for power tools. More particularly, the invention pertains to a collapsible carpentry work station and push cart combination that can be easily transported in a vehicle.

2. Description of the Prior Art

The importance and advantages of the portability of tools and work stations or work benches has long been known. For example, U.S. Pat. No. 1,828,248 issued to Hallowell discloses a portable work bench having casters to allow for movement from place to place. U.S. Pat. No. 3,118,685 issued to Jordan discloses a combination tool chest and work bench that has a pair of wheels and an elongated handle to facilitate transportation. U.S. Pat. No. 5,224,531 issued to Blohm provides a portable apparatus for storing tools which also converts into a work bench.

While these devices serve to provide satisfactory tool boxes and work benches, they suffer from the disadvantage of being unable to accommodate the storage or portability of large power tools. Today, carpenters and home craftsman largely depend on the use of power tools such as table saws, miter boxes, routers, planers, and belt sanders. The increased weight of power tools over manual tools creates a problem when dealing with the issue of portability, especially if the work station or work bench must be capable of being loaded into a vehicle, such as a van, truck, or utility vehicle for on site use.

U.S. Pat. No. 4,620,712 issued to Blackwell discloses a portable power table for power tools. While this device is capable of transporting a table adapted for use with a power tool mounted thereto, it suffers from a number of disadvantages. The device must be tilted 90 degrees for transportation in a vehicle, therefore the device must be limited in size and weight to allow an individual to be able to transport the device without the assistance from a second person. Furthermore, the device consumes a large amount of space in a vehicle due to extending legs and a vertically extending table top.

As will be described in greater detail hereinafter, the work station of the present invention differs from those previously proposed.

SUMMARY OF THE INVENTION

Accordingly, it is an object of this invention to provide a portable collapsible work station for quick set up and storage.

Another object of this invention is provide a work station adapted for use with a series of power tools or work station devices mounted in spaced side by side relation along a top length of an elongated frame structure.

Still another object of this invention is to provide a work station having a power tool or device which is rotatable 180 degrees from a tool storage position located internally of the work station to a tool operating position on top of the work station.

Yet another object of this invention is to provide a work station that can be easily loaded into a compact storage area of a vehicle for transportation to on site locations.

To achieve the foregoing and other objectives, and in accordance with the purposes of the present invention a portable collapsible work station for quick set up and storage is provided. The work station comprises an elongated frame structure including a pair of side frames. A collapsible wheel carrying frame is pivotally mounted at a first intermediate position of the elongated frame structure. The collapsible wheel carrying frame being pivoted on the elongated frame structure from a storage position lying within a horizontal plane through the elongated frame structure to an extended operating position for supporting the elongated frame structure. A support leg structure is pivotally mounted at a second intermediate position of elongated frame structure enabling the support leg structure to be moved from a storage position coplanar with the collapsible wheel carrying frame to the extended operating position for supporting the elongated frame structure.

In accordance with an aspect of the invention, a tool is rotatably secured to the elongated frame structure for rotation from a tool storage position located internally of the elongated frame structure to a tool operating position on top of the elongated frame structure.

In accordance with another aspect of the invention, a series of power tools are mounted in longitudinally spaced side by side relation along a top length of the elongated frame structure.

In accordance with yet another aspect of the invention, the portable collapsible work station as stated above is provided for use in a vehicle having a storage area with a floor, the improvement comprising the portable collapsible work station being adapted for quick set up out of the vehicle and collapsed storage on the floor of the storage area.

Other objects, features and advantages of the invention will become more readily apparent upon reference to the following description when taken in conjunction with the accompanying drawings, which drawings illustrate several embodiments of the invention.

DETAILED DESCRIPTION OF THE PREFERRED EMBODIMENT

Figure 1:
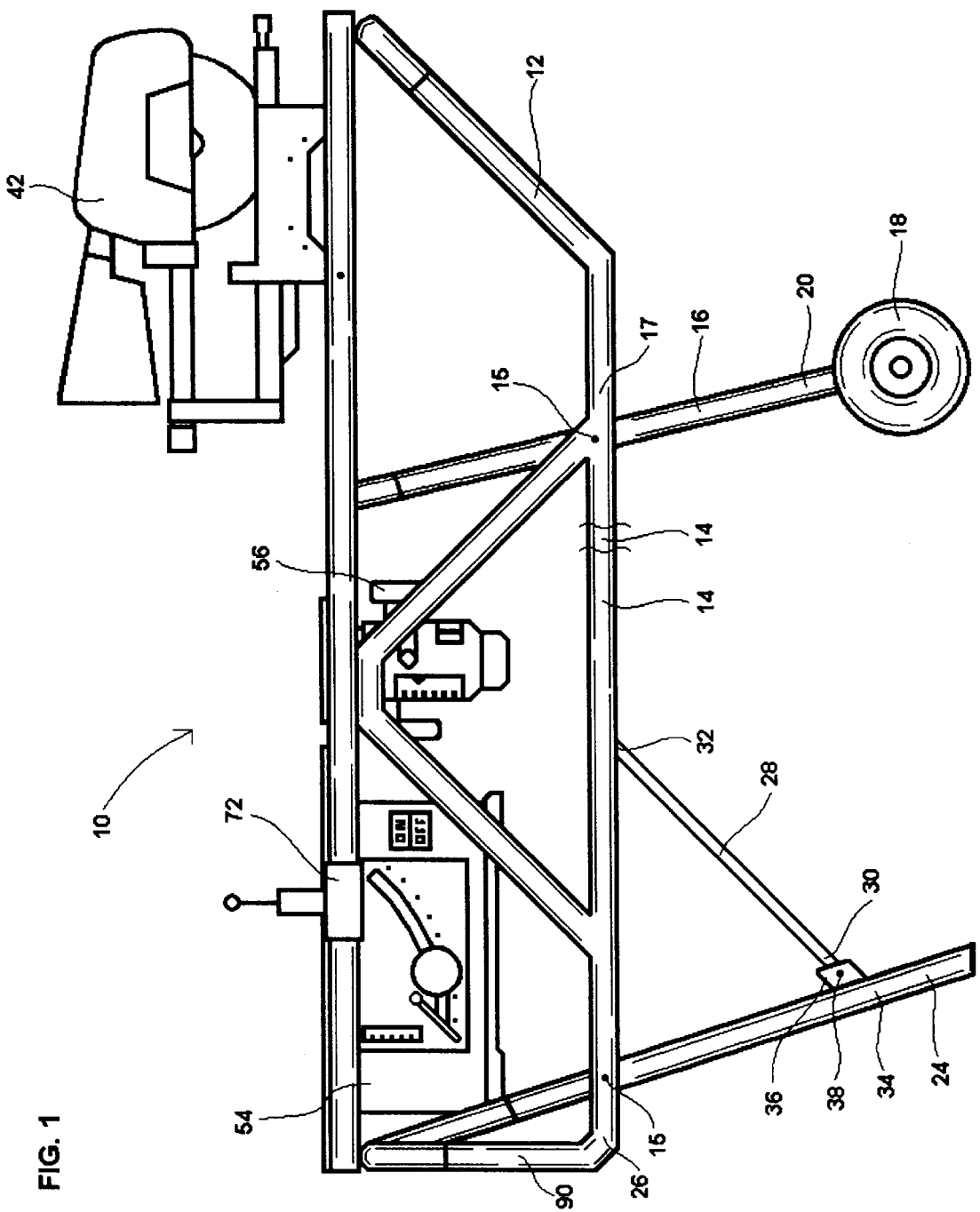
FIG. 1 is a side elevation view of the present invention in an extended operating position.
Figure 5:
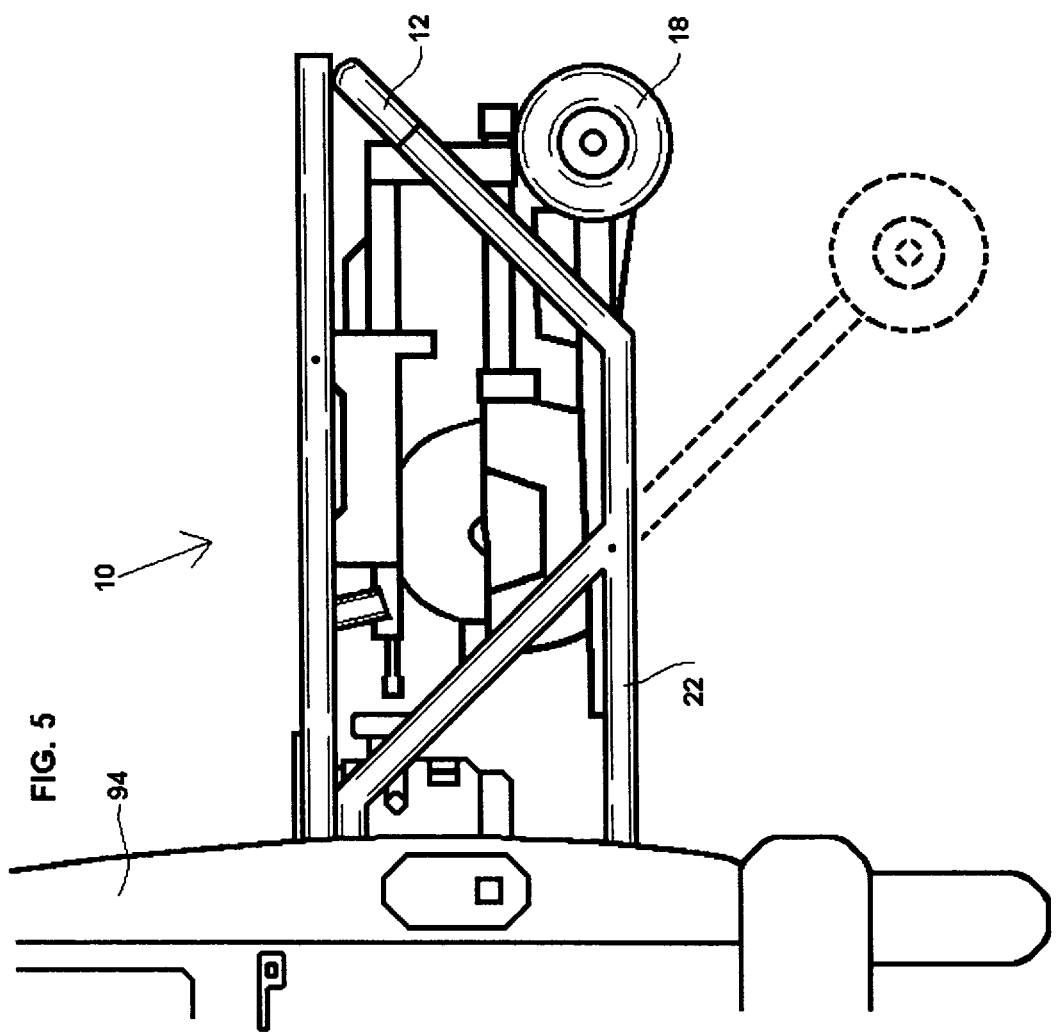
FIG. 5 is a side elevation view of the present invention showing the pivotal movement of the collapsible wheel carrying frame while loading the work station into a vehicle.
Figure 7:
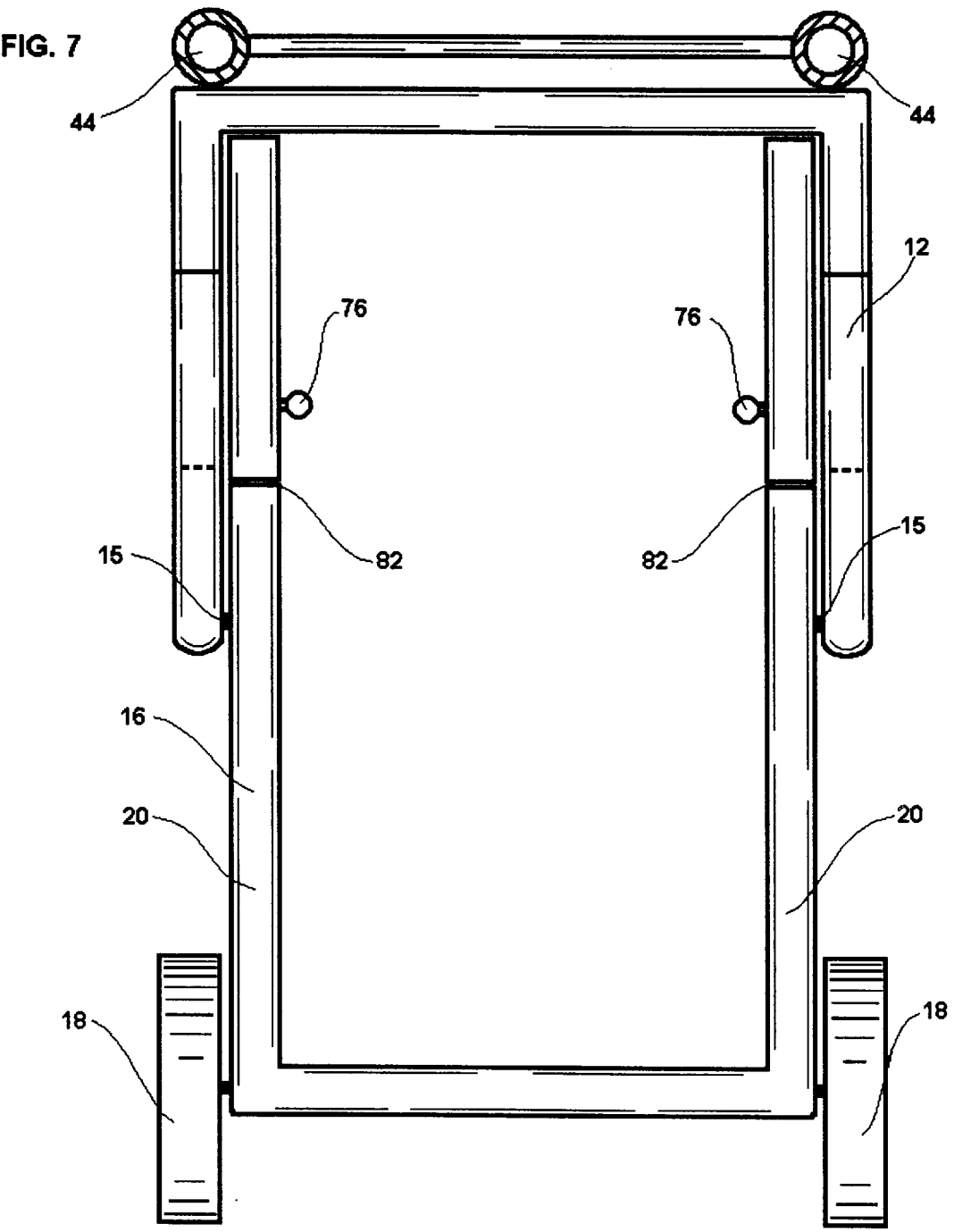
FIG. 7 is an end view of the present invention showing the collapsible wheel carrying frame.

Referring now to the drawings, a portable collapsible work station 10 for quick set up and storage is illustrated in FIG. 1. The work station 10 comprises an elongated frame structure 12 formed of metal which includes a pair of side frames 14. As illustrated in the drawings, each side frame has a horizontally extending top member and bottom member. The top members lie generally in an upper horizontal plane. The bottom members lie generally in a lower horizontal plane. The upper and lower horizontal planes and side frames generally form a chamber therewithin. The elongated frame structure 12 having a first end and a second end. A collapsible wheel carrying frame 16 is pivotally mounted with pivot pins 15 at a first intermediate position 17 of the elongated frame structure 12. The collapsible wheel carrying frame 16 is preferably U-shaped, as shown in FIG. 7, and is formed of metal. A pair of wheels 18 are rotatably secured at a lower end 20 of the collapsible wheel carrying frame 16. The collapsible wheel carrying frame 16 being pivoted on the elongated frame structure 12 from a storage position lying within a horizontal plane 22 through the elongated frame structure 12 to an extended operating position for supporting the elongated frame structure 12, as best illustrated in FIG. 5.

Figure 13:
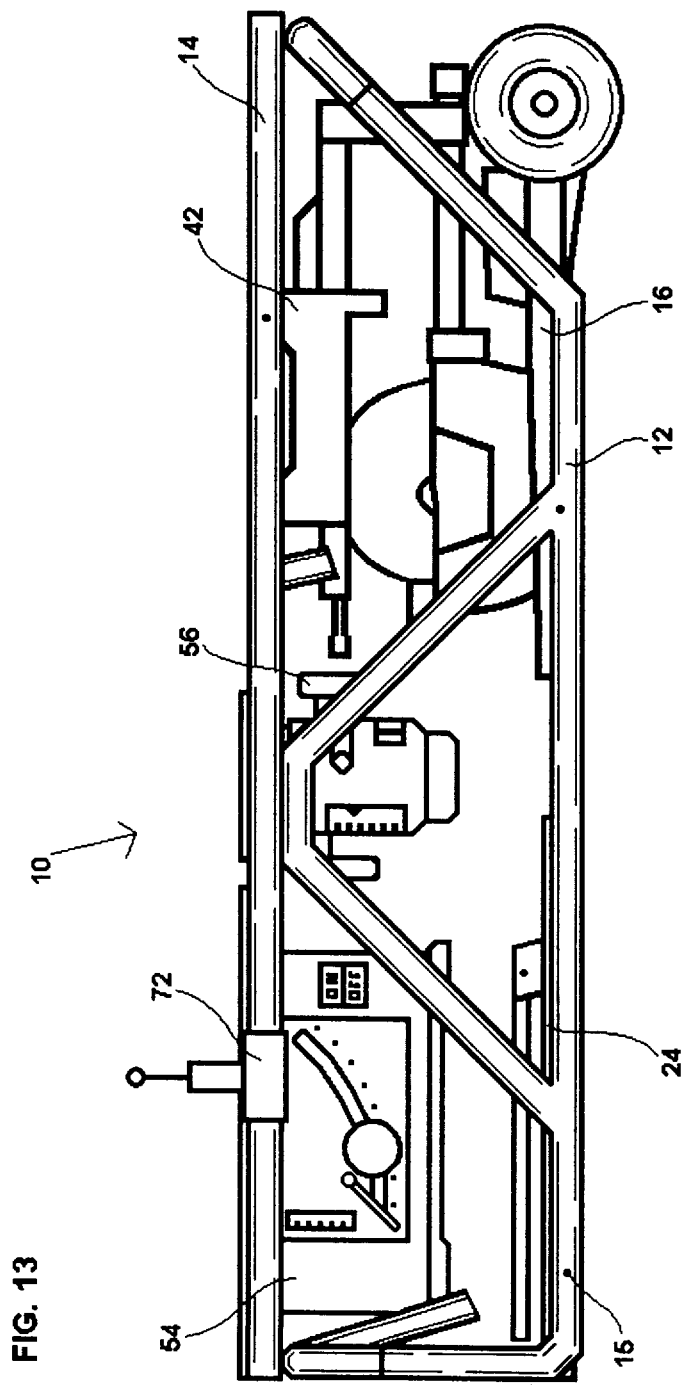
FIG. 13 is a side elevation view of the present invention in a storage position.

Referring now to FIG. 13, the first end of the elongated frame structure 12 is triangularly shaped to provide an open frame portion capable of accommodating the wheels 18 when the collapsible wheel carrying frame 16 is pivoted on the elongated frame structure 12 into a storage position lying generally within the horizontal plane through elongated frame structure.

Figure 8:
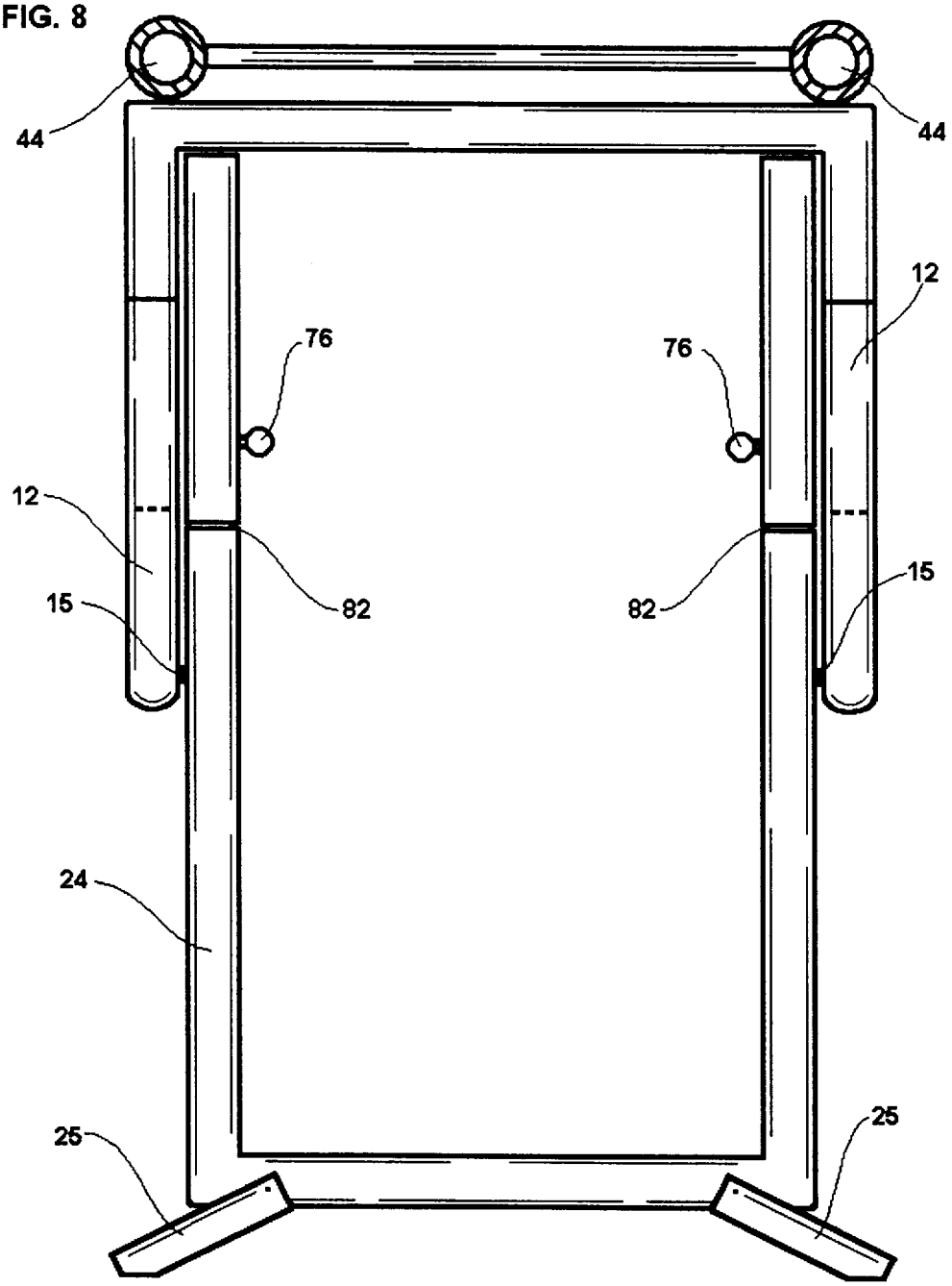
FIG. 8 is an end view of the present invention showing the support leg structure.

A support leg structure 24 is pivotally mounted with pivot pins 15 at a second intermediate position 26 of the elongated frame structure 12 enabling the support leg structure 24 to be moved from a storage position coplanar with the collapsible wheel carrying frame 16, as best shown in FIG. 13, to the extended operating position for supporting the elongated frame structure 12, as shown in FIG. 1. Preferably, the support leg structure 24 is U-shaped, as shown in FIG. 8, and is formed of metal. A pair of stabilizer feet 25 are secured to the support leg structure 24 for providing additional lateral stability. The support leg structure 24 has a pair of cross supports 28. The cross supports 28 having a first cross support end 30 and a second cross support end 32. The first cross support ends 30 being pivotally mounted to a lower support leg structure end 34 with a bracket 36 and pin 38 configuration of conventional design. Each second cross support end 32 being removably secured to one of the side frames 14.

Figure 9:
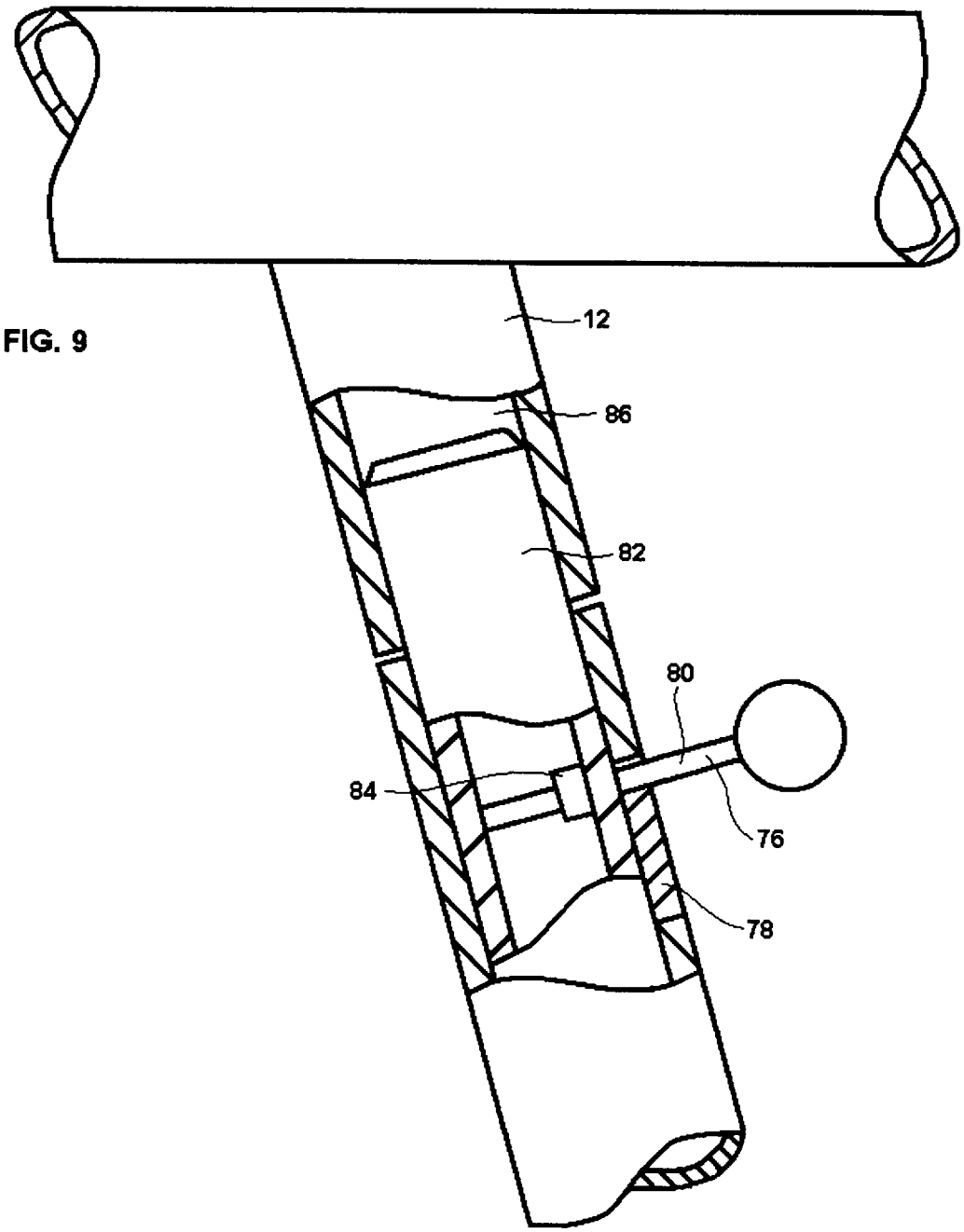
FIG. 9 is a partial sectional view of the locking structure of the present invention.

Referring to FIG. 9, a preferred locking means is provided for securing the collapsible wheel carrying frame 16 to the elongated frame structure 12 in the extended operating position. The locking means comprises a lock bolt 76 moveable within a slot 78 formed within the collapsible wheel carrying frame 16. The lock bolt 76 has external threads 80 and is inserted into a bore of a shaft 82. A locking nut 84, such as a nylon insert locknut, threadingly engages the lock bolt within an interior space of the shaft 82. The shaft slidingly engages an inner end portion of the collapsible wheel carrying frame 16 for mated engagement with a receiving bore 86 of the elongated frame structure 12. Preferably, this locking means is provided on both side frames 14. Additionally, this locking means is preferred for securing the support leg structure 24 to the side frames of the elongated frame structure 12 in the extended operating position.

Figure 10:
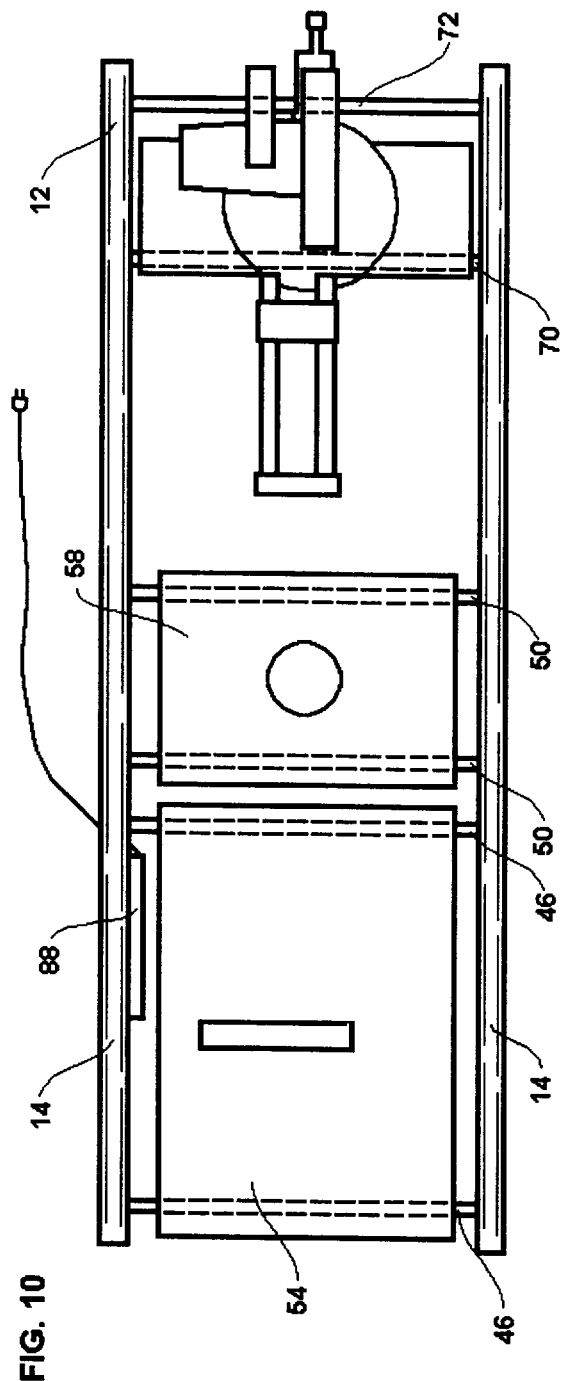
FIG. 10 is a top plan view of the present invention.
Figure 11:
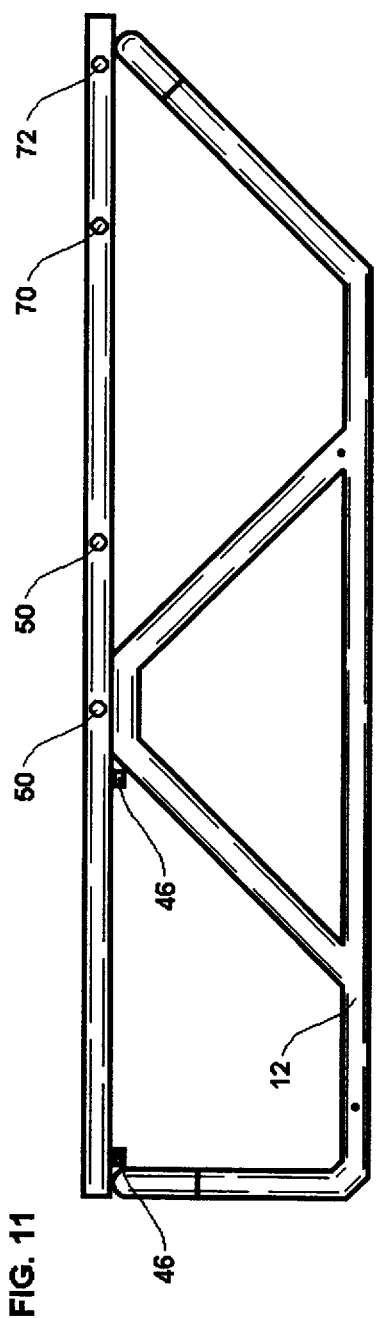
FIG. 11 is a side elevation view of the present invention.

The elongated frame structure 12 has a series of power tools or work station devices, such as table saws, routers, planers, or belt sanders mounted in longitudinally spaced side by side relation along a top length of the elongated frame structure 12. Referring now to FIG. 8, a pair of fence rails 44 are mounted to the elongated frame structure 12 coplanar with the side frames 14 for use with a fence 72. A pair of table saw struts 46 are connected perpendicularly between the side frames 14, as shown in FIGS. 10 and 11. The table saw struts 46 are used when securing a table saw 54 to the elongated frame structure 12. A pair of router struts 50 are connected perpendicularly between the side frames 14. A router 56 may be mounted to a router mounting plate 58 for secured positioning on router struts 50. It is to be understood that the use of the router mounting plate 58 or other mounting means will be dependent upon the style or type of table saw, router, or other power tool used.

Figure 2:
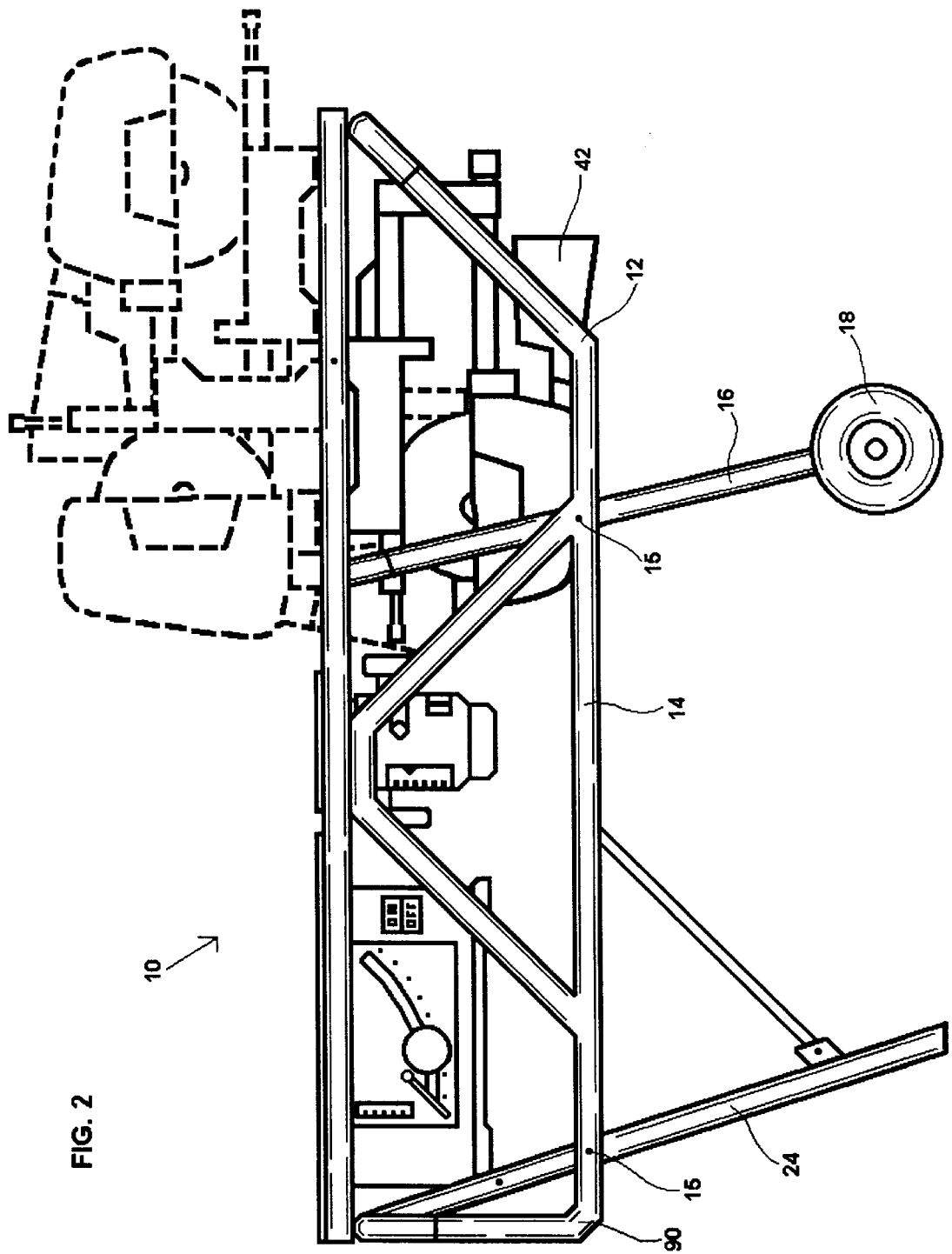
FIG. 2 is a side elevation view of the present invention showing the tool rotated from a tool operating position to a tool storage position.
Figure 3:
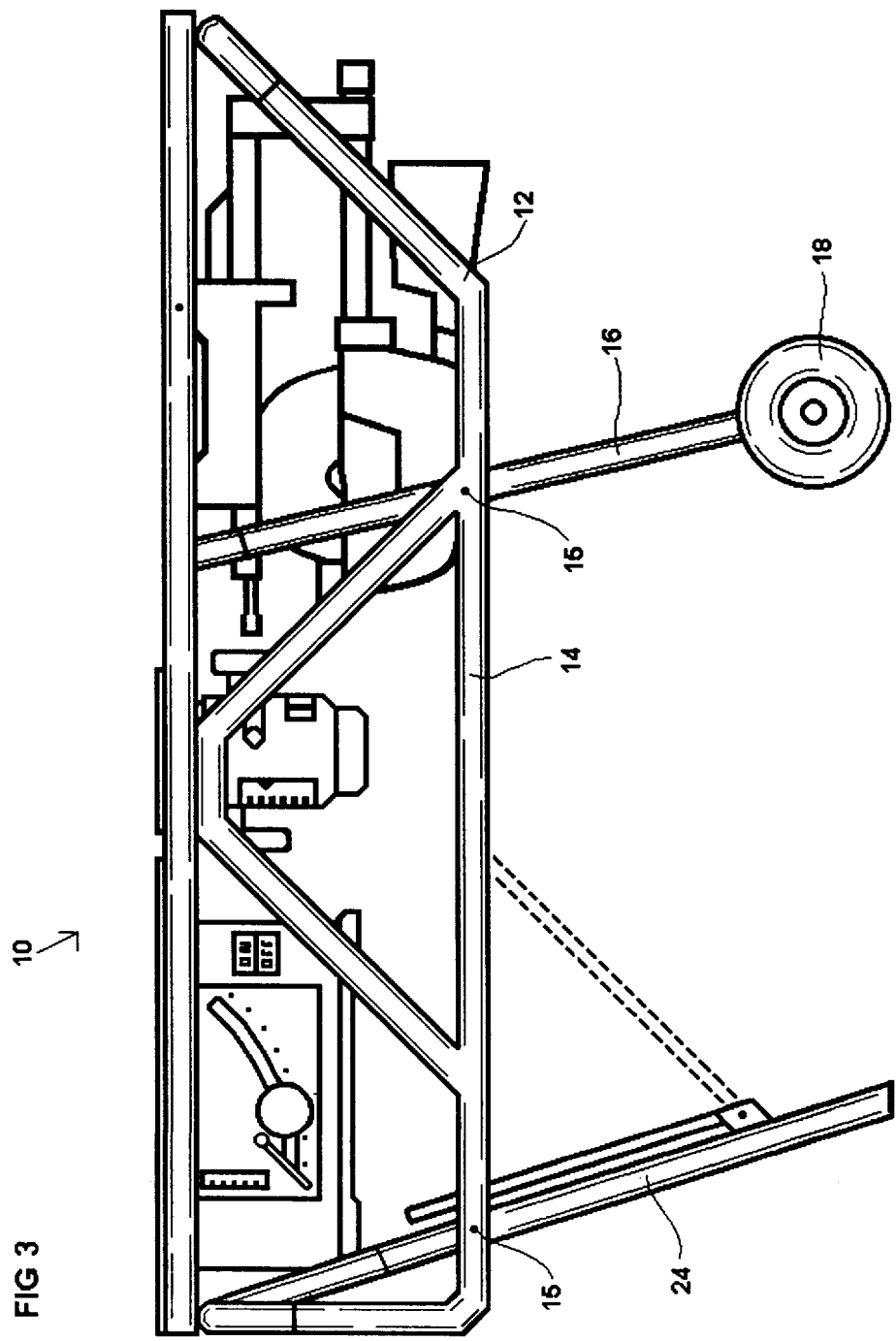
FIG. 3 is a side elevation view of the present invention showing the pivotal movement of the cross supports.
Figure 4:
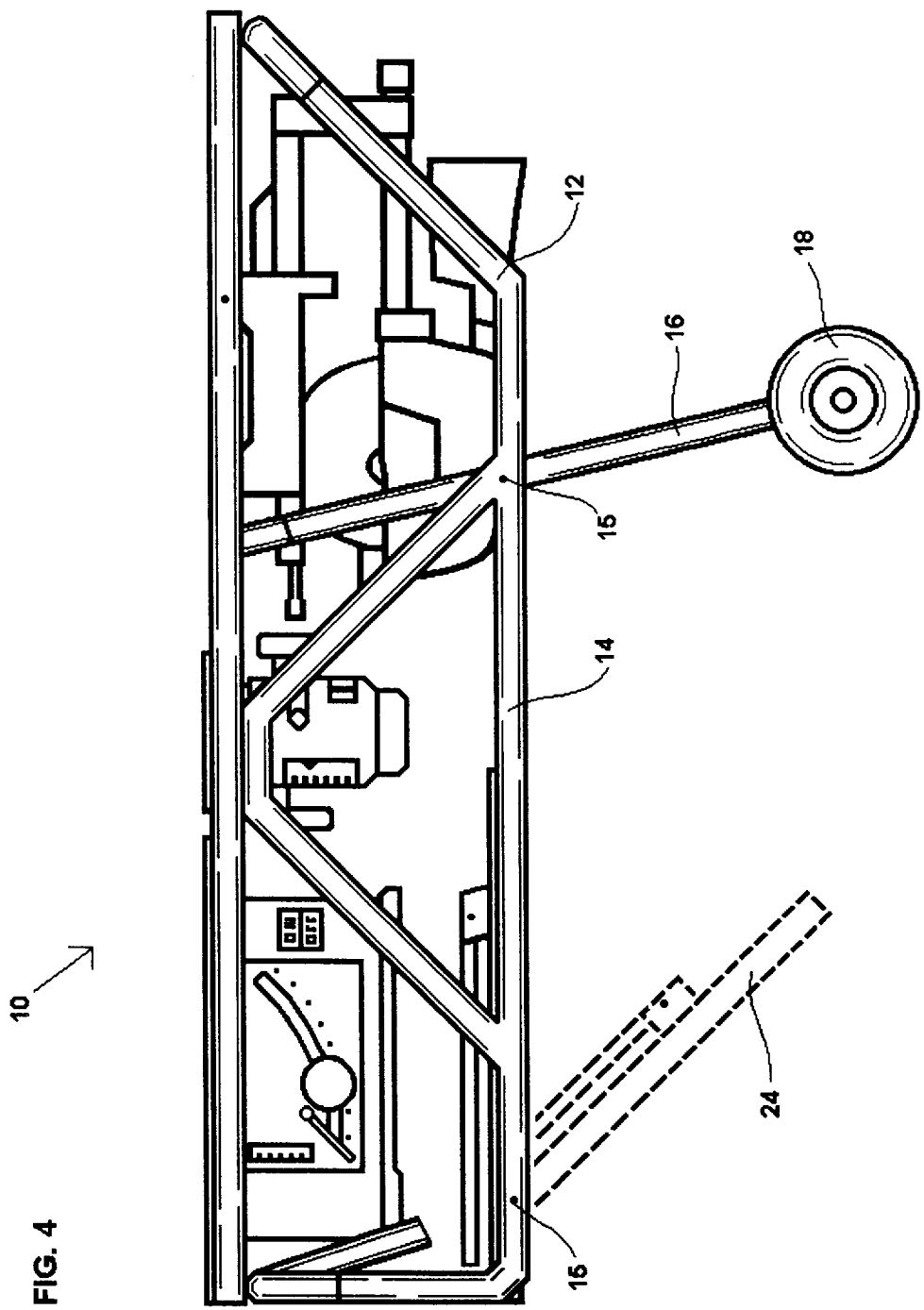
FIG. 4 is a side elevation view of the present invention showing the pivotal movement of the support leg structure.
Figure 12:
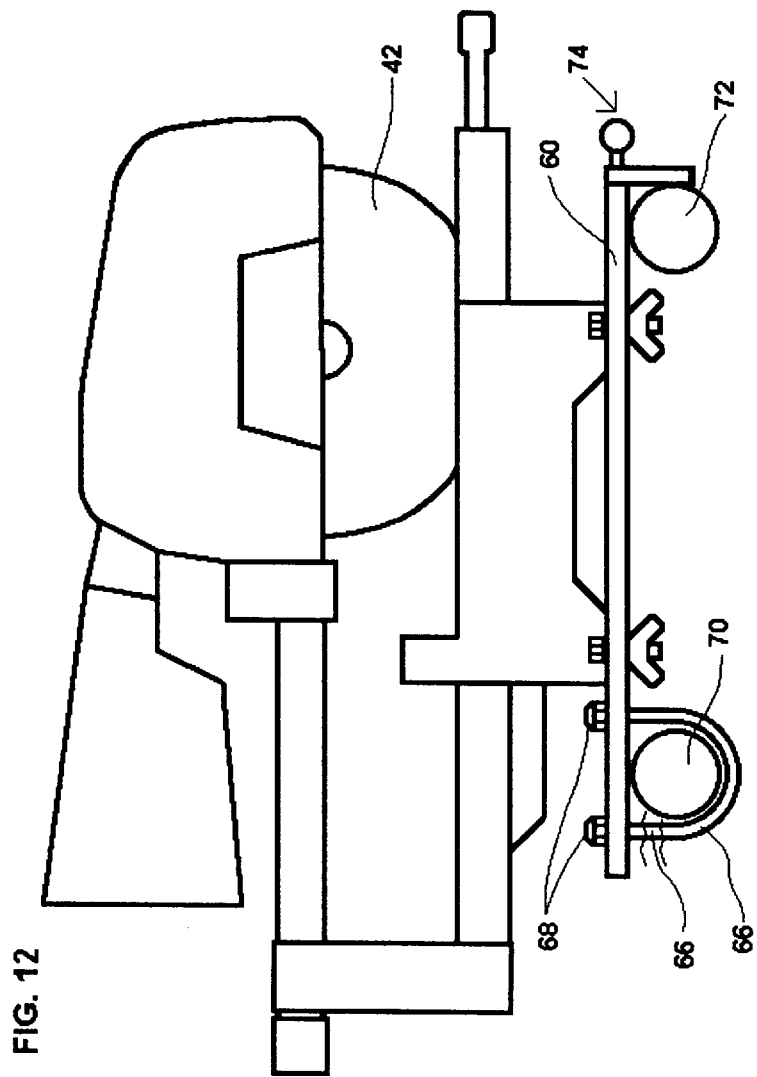
FIG. 12 is a side elevation view of the power tool mounted for rotational movement.

An additional power tool or tool 42, such as miter box, is pivotally secured to the elongated frame structure 12 with the tool 42 being rotatable 180 degrees from a tool storage position located internally of the elongated frame structure 12, as best illustrated in FIG. 2, to a tool operating position on top of the elongated frame structure, as shown in FIG. 1. Referring now to FIG. 12, a preferred manner of pivotally securing the tool 42 is shown. The tool 42 is mounted to a mounting plate 60 with mounting bolts 62 and wingnuts 64 at one side of the mounting plate 60. A pair of U-brackets 66 are connected to the mounting plate 60 with nuts 68. The U-brackets 66 are pivotally secured to a pivot strut 70. The pivot strut 70 is connected perpendicularly to the elongated frame structure 12 between the side frames 14. A second strut 72 is provided for supporting an opposite side of the mounting plate 60. A locking device or latch 74 of conventional design is provided for securing the tool 42 to the elongated frame structure 12 when the tool 42 is in the tool operating position on top of the elongated frame structure 21. As illustrated in drawings, upper ends of the collapsible wheel carrying frame extend upwardly in the extended operating position towards the horizontally extending top member of the side frame with the series of work station devices at one side of the upper ends and the tool at an opposite side of the upper ends.

A plurality of electrical outlets 88 may be connected in a spaced apart relationship to the elongated frame structure 12 to provide electricity for the power tools. The electrical outlets 88 are interconnected by electrical wire which is connected to a power source. Alternatively, an electrical power strip of conventional design may be mounted to the elongated frame structure 12.

In use, a second end portion 90 of the elongated frame structure serves as a handle means for movement of the portable collapsible work station in a cartable fashion. Preferably, the tool 42 is positioned on the first end of the elongated frame structure 12 cantilever extending away from the collapsible wheel carrying frame 16 to provide a counter balancing to the second end of the elongated frame structure 12. Thus, an individual can facilitate movement and storage of the work station 10 without the assistance from another person.

The pivot pins 15 or pivoting means being remote from opposite ends of the elongated frame structure 12. The collapsible wheel carrying frame 16 and support leg structure 24 being pivoted in a common direction and when folded into a storage position creating an essentially parallel sided frame structure suitable for disposition in a parallel sided storage compartment in a vehicle 94.

Figure 6:
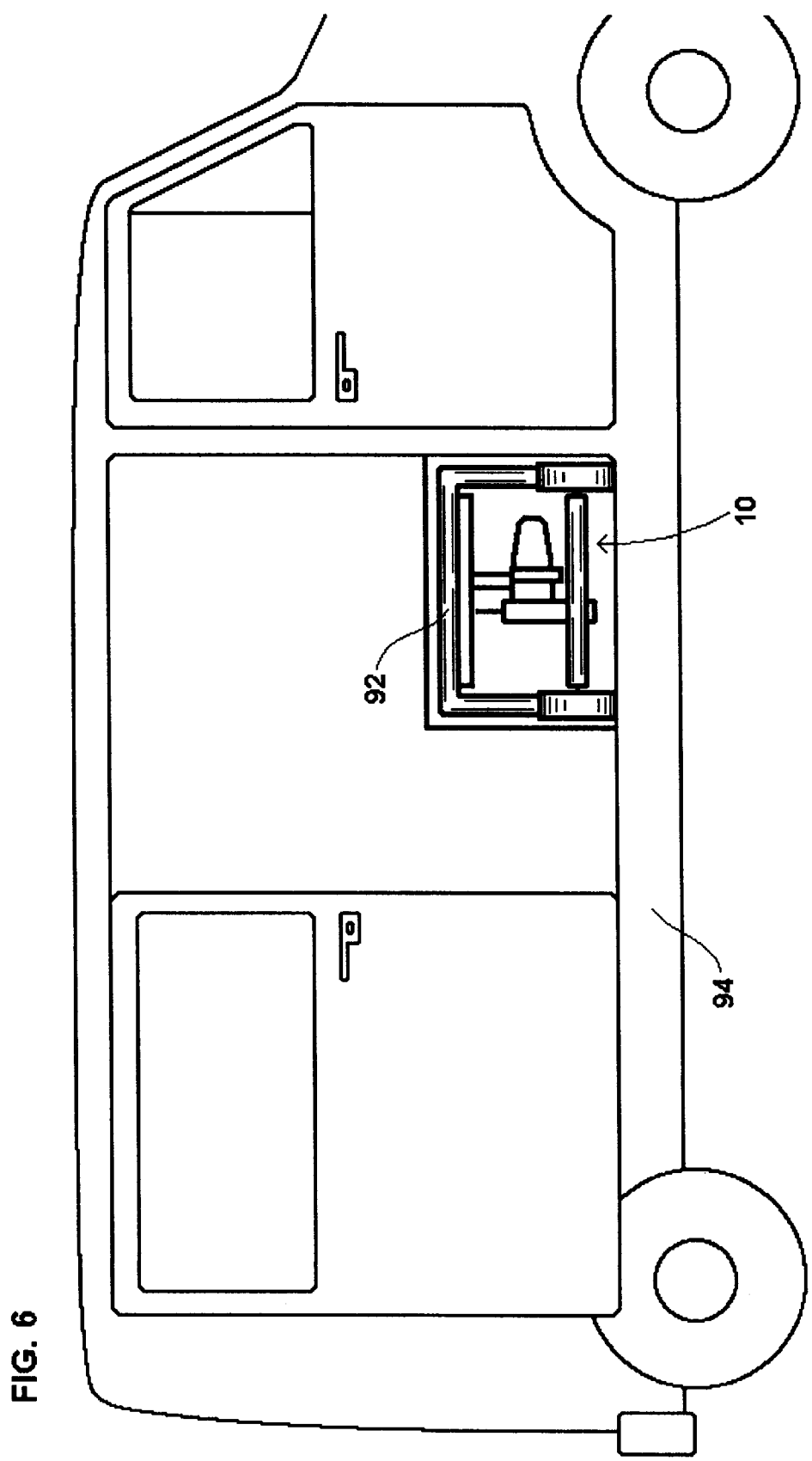
FIG. 6 is a side elevation view of the vehicle having a storage area holding the present invention in the storage position.

When the work station 10 is to be collapsed for transportation in the vehicle 94 having a floor, such as a van, truck, or utility vehicle, the forward most portion of the second end 26 of the elongated frame structure 12 is inserted into the vehicle for support of the elongated frame structure 12 when the support leg structure is collapsed into a storage position. The work station 10 will then slide into the vehicle with the floor supporting the elongated frame structure 12. The collapsible wheel carrying frame is then collapsed, as shown in FIG. 5, so that the entire work station may be stored within a compact rectangular or parallelogram storage area or compartment 92 having a reduced space, as shown in FIG. 6.

Although the invention has been described by reference to some embodiments it is not intended that the novel device be limited thereby, but that modifications thereof are intended to be included as falling within the broad scope and spirit of the foregoing disclosure, the following claims and the appended drawings.

I claim:

1. A portable collapsible work station for quick set up and storage comprising an elongated frame structure including a pair of side frames, each side frame having a horizontally extending top member and bottom member, the top members lying generally in an upper horizontal plane, the bottom members lying generally in a lower horizontal plane, the upper and lower horizontal planes and side frames generally forming a chamber therewithin, a collapsible wheel carrying frame, a first pivot means joining the collapsible wheel carrying frame at a first intermediate position of the elongated frame structure, the collapsible wheel carrying frame having a pair of wheels rotatably secured at a lower end of the collapsible wheel carrying frame, the collapsible wheel carrying frame being pivoted on the elongated frame structure from a storage position lying partially within the lower horizontal plane through the elongated frame structure to an extended operating position for supporting the elongated frame structure, a support leg structure at a second intermediate position of elongated frame structure, a second pivot means connecting the support leg structure to the elongated frame structure enabling the support leg structure to be moved on the second pivot means from a storage position coplanar with the collapsible wheel carrying frame to the extended operating position for supporting the elongated frame structure, the elongated frame structure having a series of work station devices mounted in longitudinally spaced side by side relation along a top length of the elongated frame structure, each work station device extending downwardly within the chamber with an upper horizontal operating surface of each work station device lying generally within the upper horizontal plane, a third pivot means for pivotally securing a tool to the elongated frame structure with the tool being rotatable 180 degrees on the third pivot means from a tool storage position located internally of the elongated frame structure to a tool operating position on top of the elongated frame structure.

2. The portable collapsible work station of claim 1, wherein the support leg structure has a pair of cross supports, the cross supports having a first cross support end and a second cross support end, the first cross support ends being pivotally mounted to a lower support leg structure end, and each second cross support end being removably secured to one of the side frames.

3. The portable collapsible work station of claim 1, further comprising first locking means for securing the collapsible wheel carrying frame to the elongated frame structure in the extended operating position and second locking means for securing the support leg structure to the elongated frame structure in the extended operating position.

4. The portable collapsible work station of claim 1, wherein a first end adjacent to the first intermediate position of the elongated frame of the elongated frame structure is triangularly shaped with an inclined face to allow the wheels to collapse compactly in line with the elongated frame adjacent and in the direction of the inclined face of the triangularly shaped end to provide an open frame portion capable of accommodating the wheels when the collapsible wheel carrying frame is pivoted on the elongated frame structure into a storage position lying within the horizontal plane through elongated frame structure.

5. The portable collapsible work station of claim 4, wherein the elongated frame structure has handle means for movement of the portable collapsible work station in a cartable fashion.

6. The portable collapsible work station of claim 4, further comprising a plurality of electrical outlets electrically connected in a spaced apart relationship by an electrical wire means for providing electricity to the electrical outlets.

7. The portable collapsible work station of claim 4, wherein the third pivot means includes a pair of U-brackets connected to a mounting plate, the U-brackets pivotally secured to a pivot strut, the pivot strut connected to elongated frame structure perpendicular to the side frames.

8. The portable collapsible work station of claim 6, further comprising third locking means for securing the tool to the elongated frame structure when the tool is in the tool operating position on top of the elongated frame structure.

9. A portable collapsible work station for quick set up and storage, comprising: an elongated frame structure including a pair of side frames, each side frame having a horizontally extending top member and bottom member, the top members lying generally in an upper horizontal plane, the bottom members lying generally in a lower horizontal plane, the upper and lower horizontal planes and side frames generally forming a chamber therewithin, a collapsible wheel carrying frame, a first pivot means joining the collapsible wheel carrying frame at a first intermediate position of the elongated frame structure, the collapsible wheel carrying frame having a pair of wheels rotatably secured at a lower end of the collapsible wheel carrying frame, the collapsible wheel carrying frame being pivoted on the elongated frame structure from a storage position lying partially within the lower horizontal plane through the elongated frame structure to an extended operating position for supporting the elongated frame structure, a support leg structure at a second intermediate position of elongated frame structure, a second pivot means connecting the support leg structure to the elongated frame structure enabling the support leg structure to be moved on the second pivot means from a storage position coplanar with the collapsible wheel carrying frame to the extended operating position for supporting the elongated frame structure, the elongated frame structure having a series of work station devices mounted in longitudinally spaced side by side relation along a top length of the elongated frame structure, each work station device extending downwardly within the chamber with an upper horizontal operating surface of each work station device lying generally within the upper horizontal plane.

10. The portable collapsible work station of claim 9, wherein the elongated frame structure has handle means for movement of the portable collapsible work station in a cartable fashion.

11. In a vehicle having a storage area with a floor, the improvement comprising a portable collapsible work station for quick set up out of the vehicle and collapsed storage on the floor of the storage area, the collapsible work station comprising an elongated frame structure including a pair of side frames, each side frame having a horizontally extending top member and bottom member, the top members lying generally in an upper horizontal plane, the bottom members lying generally in a lower horizontal plane, the upper and lower horizontal planes and side frames generally forming a chamber therewithin, a collapsible wheel carrying frame, a first pivot means joining the collapsible wheel carrying frame at a first intermediate position of the elongated frame structure, the collapsible wheel carrying frame being pivoted on the elongated frame structure from a storage position lying partially within the lower horizontal plane through the elongated frame structure to an extended operating position for supporting the elongated frame structure, a support leg structure at a second intermediate position of elongated frame structure, a second pivot means connecting the support leg structure to the elongated frame structure enabling the support leg structure to be moved on the second pivot means from a storage position coplanar with the collapsible wheel carrying frame to the extended operating position for supporting the elongated frame structure, the elongated frame structure having a series of work station devices mounted in longitudinally spaced side by side relation along a top length of the elongated frame structure, each work station device extending downwardly within the chamber with an upper horizontal operating surface of each work station device lying generally within the upper horizontal plane, a third pivot means for pivotally securing a tool to the elongated frame structure with the tool being rotatable on the third pivot means from a tool storage position located internally of the elongated frame structure to a tool operating position on top of the elongated frame structure, the collapsible wheel carrying frame has a pair of wheels rotatably secured at a lower end of the collapsible wheel carrying frame.

12. The vehicle of claim 11, further comprising a series of power tools mounted in longitudinally spaced side by side relation along a top length of the elongated frame structure.

13. The portable collapsible work station of claim 11, further comprising first locking means for securing the collapsible wheel carrying frame to the elongated frame structure in the extended operating position and second locking means for securing the support leg structure to the elongated frame structure in the extended operating position.

14. The portable collapsible work station of claim 11, further comprising third locking means for securing the tool to the elongated frame structure when the tool is in the tool operating position on top of the elongated frame structure.

15. A portable collapsible work station for quick set up and storage comprising an elongated frame structure including a pair of side frames, a collapsible wheel carrying frame, a first pivot means joining the collapsible wheel carrying frame at a first intermediate position of the elongated frame structure, the collapsible wheel carrying frame being pivoted on the elongated frame structure from a storage position lying within a horizontal plane through the elongated frame structure to an extended operating position for supporting the elongated frame structure, a support leg structure at a second intermediate position of elongated frame structure, a second pivot means connecting the support leg structure to the elongated frame structure enabling the support leg structure to be moved on the second pivot means from a storage position coplanar with the collapsible wheel carrying frame to the extended operating position for supporting the elongated frame structure, the elongated frame structure having a series of work station devices mounted in longitudinally spaced side by side relation along a top length of the elongated frame structure, a third pivot means for pivotally securing a tool to the elongated frame structure with the tool being rotatable 180 degrees on the third pivot means from a tool storage position located internally of the elongated frame structure to a tool operating position on top of the elongated frame structure, the collapsible wheel carrying frame has a pair of wheels rotatably secured at a lower end of the collapsible wheel carrying frame, the first end of the elongated frame structure is triangularly shaped with an inclined face to allow the wheels to collapse compactly in line with the elongated frame adjacent and in the direction of the inclined face of the triangularly shaped end.

16. A portable collapsible work station for quick set up and storage in a parallelogram compartment, comprising in combination an elongated frame structure including a pair of side frames, a collapsible wheel carrying frame, a first pivot means joining the collapsible wheel carrying frame at a first intermediate position of the elongated frame structure, the collapsible wheel carrying frame being pivoted on the elongated frame structure from a storage position lying within a horizontal plane through the elongated frame structure to an extended operating position for supporting the elongated frame structure, a support leg structure at a second intermediate position of elongated frame structure, and a second pivot means connecting the support leg structure to the elongated frame structure enabling the support leg structure to be moved on the second pivot means from a storage position coplanar with the collapsible wheel carrying frame to the extended operating position for supporting the elongated frame structure, the first end of the elongated frame structure is triangularly shaped with an inclined face to allow the wheels to collapse compactly in line with the elongated frame adjacent and in the direction of the inclined face of the triangularly shaped end.

17. The portable collapsible work station of claim 16 further comprising a series of power tools mounted in longitudinally spaced side by side relation along a top length of the elongated frame structure.

18. The combination of claim 16, further comprising a third pivot means for pivotally securing a tool to the elongated frame structure with the tool being rotatable on the third pivot means from a tool storage position located internally of the elongated frame structure to a tool operating position on top of the elongated frame structure.

19. The combination of claim 18, wherein the tool is positioned on the first end of the elongated frame structure cantilever extending away from the collapsible wheel carrying frame to provide a counter balancing to the second end of the elongated frame structure.

20. The combination of claim 18, further comprising third locking means for securing the tool to the elongated frame structure when the tool is in the tool operating position on top of the elongated frame structure.

21. The combination of claim 16, wherein the support leg structure has a pair of cross supports, the cross supports having a first cross support end and a second cross support end, the first cross support ends being pivotally mounted to a lower support leg structure end, and each second cross support end being removably secured to one of the side frames.

22. A portable collapsible work station for quick set up and storage, comprising: an elongated frame structure including a pair of side frames, a collapsible wheel carrying frame, a first pivot means joining the collapsible wheel carrying frame at a first intermediate position of the elongated frame structure, the collapsible wheel carrying frame having a pair of wheels rotatably secured at a lower end of the collapsible wheel carrying frame, the collapsible wheel carrying frame being pivoted on the elongated frame structure from a storage position lying within a horizontal plane through the elongated frame structure to an extended operating position for supporting the elongated frame structure, a support leg structure at a second intermediate position of elongated frame structure, a second pivot means connecting the support leg structure to the elongated frame structure enabling the support leg structure to be moved on the second pivot means from a storage position coplanar with the collapsible wheel carrying frame to the extended operating position for supporting the elongated frame structure, the elongated frame structure having a series of work station devices mounted in longitudinally spaced side by side relation along a top length of the elongated frame structure, a third pivot means for pivotally securing a tool to the elongated frame structure with the tool being rotatable 180 degrees on the third pivot means from a tool storage position located internally of the elongated frame structure to a tool operating position on top of the elongated frame structure, the tool being positioned on a first end of the elongated frame structure cantilever extending away from the collapsible wheel carrying frame in the extended operating position to provide a counter balancing to the second end of the elongated frame structure to facilitate movement and storage of the work station by a single user, upper ends of the collapsible wheel carrying frame extending upwardly in the extended operating position towards a horizontally extending top member of the side frame with the series of work station devices at one side of the upper ends and the tool at an opposite side of the upper ends.

* * * * *